US009812952B2

(12) United States Patent
Huang et al.

(10) Patent No.: US 9,812,952 B2
(45) Date of Patent: Nov. 7, 2017

(54) ENHANCED TRANSIENT RESPONSE TO SUPPLY POWER FROM ENERGY HARVESTERS

(71) Applicant: Intel Corporation, Santa Clara, CA (US)

(72) Inventors: Lilly Huang, Portland, OR (US); Yang-Lin Chen, Taipei (TW); Vaibhav Vaidya, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 520 days.

(21) Appl. No.: 14/316,334

(22) Filed: Jun. 26, 2014

(65) Prior Publication Data

US 2015/0381033 A1 Dec. 31, 2015

(51) Int. Cl.

| | |
|---|---|
| ***H02M 3/04*** | (2006.01) |
| ***H02J 1/14*** | (2006.01) |
| ***H02M 3/156*** | (2006.01) |
| ***H02J 7/34*** | (2006.01) |
| *H02M 1/00* | (2006.01) |

(52) U.S. Cl.

CPC ................. *H02M 3/04* (2013.01); *H02J 7/34* (2013.01); *H02M 3/156* (2013.01); *H02M 2001/0048* (2013.01); *Y02B 40/90* (2013.01); *Y02B 70/1491* (2013.01)

(58) Field of Classification Search

CPC ................... H02M 3/04; H02M 3/156; H02M 2001/0048; H02J 7/34; Y02B 70/1491; Y02B 40/90

USPC .......................................................... 323/234

See application file for complete search history.

(56) References Cited

U.S. PATENT DOCUMENTS

| | | | | |
|---|---|---|---|---|
| 5,903,449 A * | 5/1999 | Garrigan | H02J 7/34 363/41 |
| 7,514,900 B2 * | 4/2009 | Sander | H02J 7/008 320/101 |
| 8,319,470 B2 * | 11/2012 | English | H02J 7/0073 136/244 |
| 2007/0103122 A1 * | 5/2007 | Morong | G05F 1/46 323/205 |
| 2011/0006742 A1 * | 1/2011 | Teggatz | H02J 7/35 323/234 |

(Continued)

OTHER PUBLICATIONS

Huang et al., "Battery Charger for Different Power Sources", U.S. Appl. No. 14/278,813, filed May 15, 2014, 42 pages.

*Primary Examiner* — Jared Fureman
*Assistant Examiner* — Michael Warmflash
(74) *Attorney, Agent, or Firm* — Jordan IP Law, LLC

(57) ABSTRACT

Systems and methods may provide for a transient response apparatus that includes a single stage conversion module having a power input, a power output, and a control input, and a compensation module including a feedback input. The compensation module may be coupled to the power input, the power output and the control input of the single stage conversion module. Additionally, a feedback module may be coupled to the power output of the single stage conversion module and the feedback input of the compensation module. In one example, the feedback module includes a loop controller having a plurality of programmable inputs and an error output, and a modulus unit coupled to the error output of the loop controller and the feedback input of the compensation module.

24 Claims, 5 Drawing Sheets

(56) References Cited

U.S. PATENT DOCUMENTS

| | | | | |
|---|---|---|---|---|
| 2014/0001849 | A1 | 1/2014 | Huang et al. | |
| 2014/0184160 | A1* | 7/2014 | Huang | H02J 7/35 320/114 |
| 2014/0285133 | A1* | 9/2014 | Toledo | H02J 7/007 320/101 |

* cited by examiner

ENHANCED TRANSIENT RESPONSE TO SUPPLY POWER FROM ENERGY HARVESTERS

TECHNICAL FIELD

Embodiments generally relate to power delivery. More particularly, embodiments relate to achieving an enhanced transient response for systems powered by energy harvesters.

BACKGROUND

A majority of mobile devices may operate under DC (direct current) voltage supply. These devices may shut down or malfunction if the voltage provided by a power source varies, which may often occur when the power source is a photovoltaic (PV, e.g., solar) panel. For example, if a tablet is connected directly to a typical solar panel (e.g., 21V supply voltage) via a USB (Universal Serial Bus, e.g., USB Specification 3.0, Rev. 1.0, Nov. 12, 2008, USB Implementers Forum) connection, the tablet may not power on or may be destroyed due to voltage incompatibilities. Moreover, large power discrepancies between the source and load may further cause instabilities such as oscillations in the power delivery network due to the relatively slow response times of traditional hysteretic types of control mechanisms used in conventional power delivery networks.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
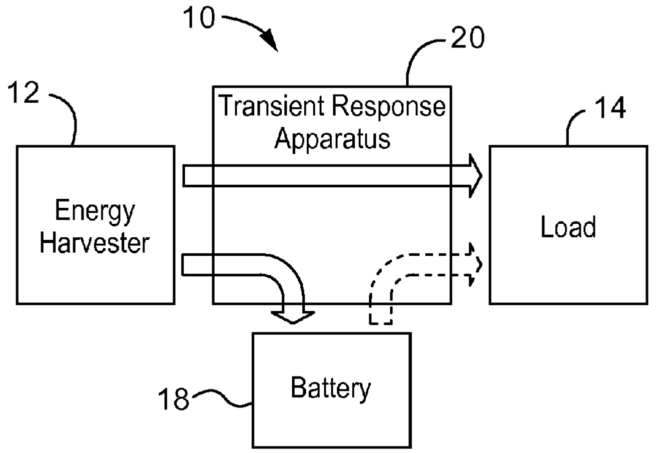
FIG. 1 is a block diagram of an example of a power delivery architecture according to an embodiment.

Turning now to FIG. 1, a power delivery architecture 10 is shown in which an energy harvester 12 such as, for example, a solar panel, piezoelectric transducer (PZT), or other alternative energy source supplies power to a load 14 such as, for example, a processor, memory device, display, etc., of a computing system. The illustrated energy harvester 12 also charges a battery 18, which may supply power to the load 14. Alternatively, the load 14 may obtain power from an AC (alternating current) adaptor (not shown), wherein the AC adaptor may also charge the battery 18, depending upon the circumstances. In the illustrated example, a transient response apparatus 20 receives the supply power from the energy harvester 12 and/or the battery 18, converts the supply power to system power, and uses the system power to drive the load 14 and/or charge the battery 18. The system power output by the transient response apparatus 20 may therefore have the appropriate voltage and current levels to support proper load operation and/or battery charging. As will be discussed in greater detail, the transient response apparatus 20 may substantially reduce oscillations and other instabilities in the system power even when the supply power from the energy harvester 12 far exceeds the power requirements of the load 14. As a result, the illustrated architecture 10 may exhibit greater efficiency, increased stability, enhanced performance, less power consumption and extended battery life.

Figure 2:
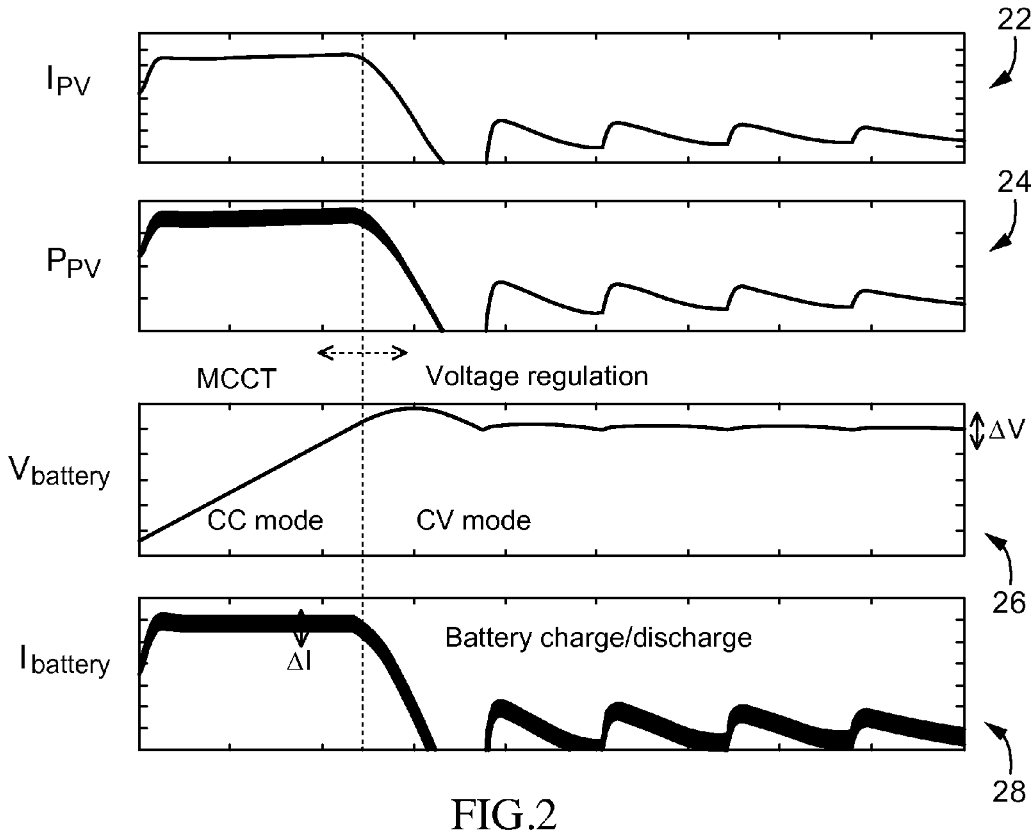
FIG. 2 is a plot of an example of a set of power delivery curves according to an embodiment.

FIG. 2 shows a set of power delivery curves. More particularly, a photovoltaic current ("$I_{PV}$", e.g., source current) curve 22 may demonstrate the current that is received at a power input of a transient response apparatus such as, for example, the transient response apparatus 20 (FIG. 1), a photovoltaic power ("$P_{PV}$", e.g., source power) curve 24 may demonstrate the power that is received at the power input of the transient response apparatus, a battery voltage ("$V_{battery}$", e.g., charge voltage, system voltage) curve 26 may demonstrate the voltage that is generated for a power output of the transient response apparatus, a battery current ("$I_{battery}$", e.g., charge current, system current) curve 28 may demonstrate the current that is generated for the power output of the transient response apparatus, and so forth.

In the illustrated example, maximum charge current tracking (MCCT) may generally be used to charge the battery at a relatively high rate. Accordingly, the battery current curve 28 remains at a relatively flat level in a constant current (CC) mode and the illustrated battery voltage curve 26 ramps up during maximum charge current tracking. During MCCT, maximum power may be "scavenged" from the energy harvester in order to charge the battery at its highest rate. Once the battery voltage reaches a certain value (e.g., 95% of the maximum battery voltage), the transient response apparatus may transition into a constant voltage (CV) mode in which voltage regulation takes place in order to maintain the battery voltage at a particular level (e.g., within a voltage difference "ΔV" of that level).

Figure 3:
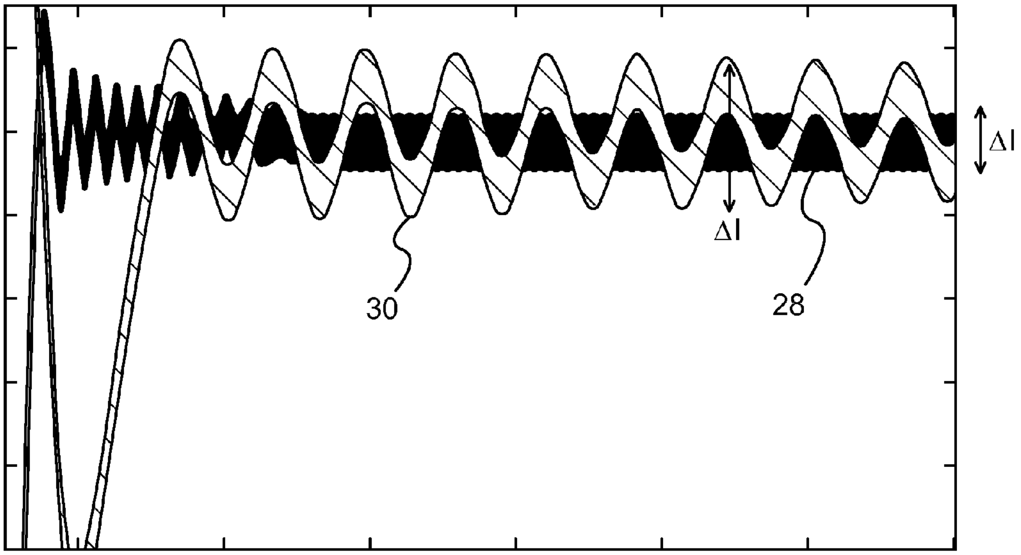
FIG. 3 is an enlarged plot of an example of a conventional charge current curve and a charge current curve according to an embodiment.

Of particular note is that during maximum charge current tracking, fluctuations in the battery current (e.g., within a current difference "ΔI" of the constant current level) may be minimized by using the system power to scale conversion adjustments made during constant current mode. For example, FIG. 3 demonstrates in an enlarged view of the constant current mode that the battery current curve 28 may exhibit a substantially smaller ΔI than a conventional battery current curve 30 that may not use the system power to scale conversion adjustments made during the constant current mode.

Figure 4:
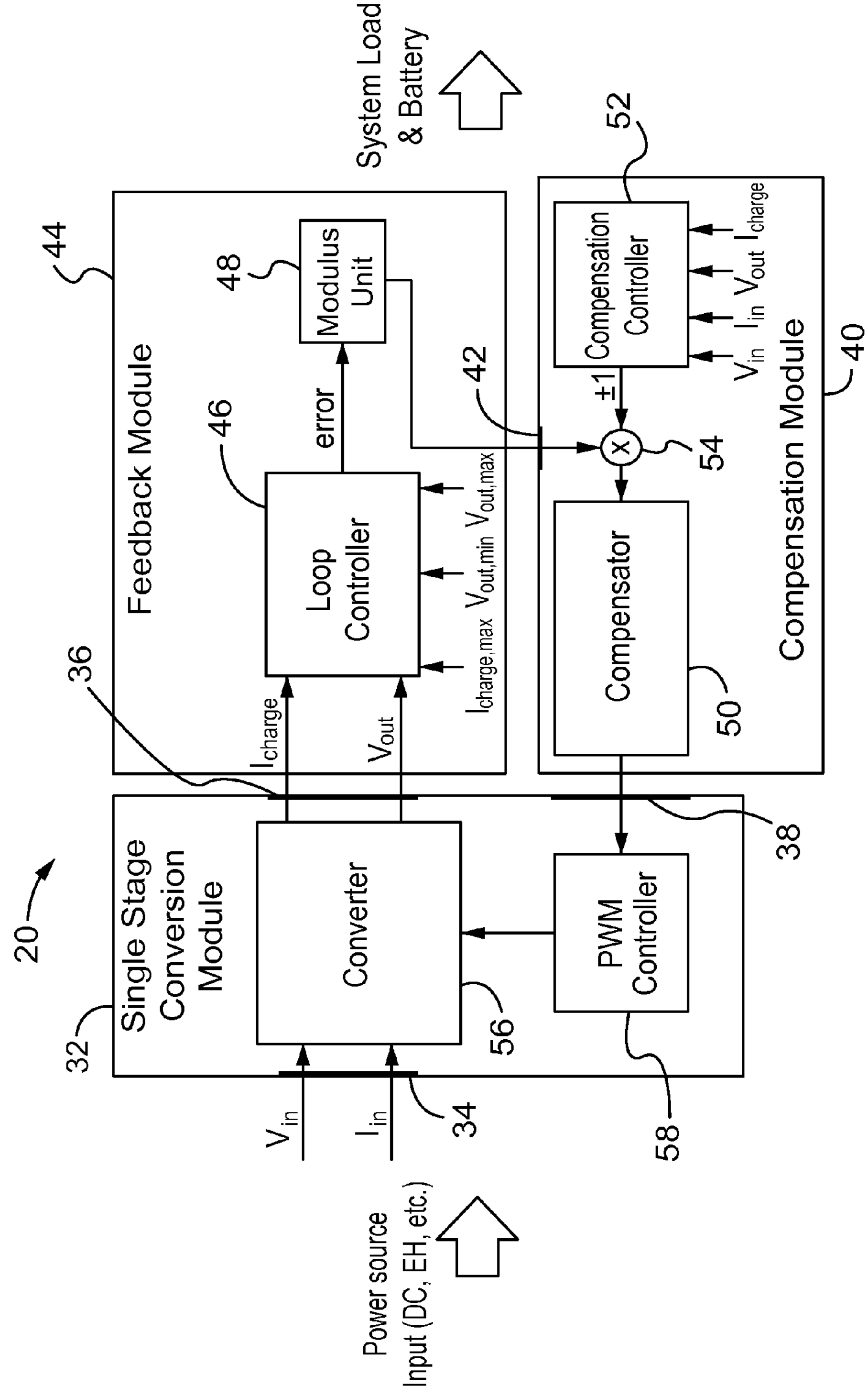
FIG. 4 is a block diagram of an example of a transient response apparatus according to an embodiment.

FIG. 4 shows one approach to implementing the transient response apparatus 20. In the illustrated example, a single stage conversion module 32 includes a power input 34, a power output 36 and a control input 38. The power input 34 of the single stage conversion module 32 may receive, for example, an input voltage ("$V_{in}$", e.g., source voltage) and an input current ("$I_{in}$", e.g., source current) from a power source such as the energy harvester 12 (FIG. 1), the battery 18 (FIG. 1), etc. The power output 36 of the single stage conversion module 32 may provide an output voltage ("$V_{out}$", e.g., system voltage) and a charge current ("$I_{charge}$", e.g., system current).

A compensation module 40 may include a feedback input 42, wherein the illustrated compensation module 40 is coupled to the power input 34 (e.g., receiving $V_{in}$ and $I_{in}$), the power output 36 (e.g., receiving $V_{out}$ and $I_{charge}$), and the control input 38 of the single stage conversion module 32. The illustrated transient response apparatus 20 also includes a feedback module 44 coupled to the power output 36 of the single stage conversion module 32 and the feedback input 42 of the compensation module 40.

In operation, the single stage conversion module 32 may generate system power for the power output 36 based on source power from the power input 34 and a control signal from the control input 38. Additionally, the compensation module 40 may generate the control signal based on the source power, the system power, and a feedback signal from the feedback input 42 of the compensation module 40. Moreover, the illustrated feedback module 44 generates the feedback signal based on the system power.

Generating the feedback signal based on the system power may enable the transient response apparatus 20 to reduce oscillations in the battery current during constant current mode because conversion adjustments are made based on the output of the single stage conversion module 32. As already noted, the reduced oscillations may in turn provide greater efficiency, increased stability, enhanced performance, less power consumption and extended battery life. Indeed, configuring the conversion module 32 as a single stage may make information regarding the system power readily available for feedback processing and use by the conversion module 32, wherein that information may not otherwise be available to multiple stages of a conventional cascaded converter.

In one example, the feedback module 44 includes a loop controller 46 having a plurality of programmable inputs and an error output that is a function of the power output 36 and one or more of the plurality of programmable outputs. The plurality of programmable inputs may include, for example, maximum charge current ("$I_{charge,max}$"), maximum output voltage ("$V_{out,max}$"), minimum output voltage ("$V_{out,min}$"), and so forth. In general, the loop controller 46 may generate an error signal via the error output of the loop controller 46 based on the programmable outputs and the system power. Thus, the error signal may be proportionate to the difference between the charge current and the maximum charge current, the difference between the output voltage and the maximum output voltage, the difference between the output voltage and the minimum output voltage, and so forth. The illustrated feedback module 44 also includes a modulus unit 48, wherein the modulus unit 48 may take the absolute value (e.g., $|u|$) of the error signal. The absolute value of the error signal may be applied to the feedback input 42 of the compensation module 40.

The illustrated compensation module 40 includes a compensator 50 having a transfer function output coupled to the control input 38 of the single stage conversion module 32. A compensation controller 52 may be coupled to the power input of the single stage conversion module 32 (e.g., receiving $V_{in}$ and $I_{in}$), wherein the illustrated compensation module 40 also includes a multiplier 54 coupled to the compensator 50, the compensation controller 52 and the feedback input 42 of the compensation controller. The illustrated multiplier 54 scales the output of the compensation controller 52 based on the value received via the feedback input 42. Accordingly, the compensator 50 may generate a continuous transfer function signal for the transfer function output of the compensation module 40 based on a scaled correction signal obtained from the multiplier 54.

More particularly, the illustrated compensation controller 52 generates an unscaled correction signal (e.g., ±1 discrete transfer function) based at least in part on the source power. For example, a comprehensive control rule might be summarized for the compensation controller 52 as in the following.

$$B=(Iin\_k+1<Iin\_k)$$

$$XOR(Pin\_k+1>Pin\_k)$$

$$XOR((I\_charge\_k+1>I\_max)$$

$$OR(V\_out\_k+1>V\_max))$$

$$\text{if } B=1, Iref\_k+1=Iref\_k+\Delta I$$

$$\text{if } B=0, Iref\_k+1=Iref\_k-\Delta I$$

Where B represents a Boolean value. The illustrated rule is given in digital format in which k, k+1 indicate sequential values, Iin and Pin represent the current and power of an input power source, V_out represents the voltage output, I_charge represent the charging (+) or discharging (−) current associated with the battery, I_max represents the maximum charging current, V_max represents the maximum voltage, Iref is a reference current control variable, and ΔI is the current step, which may be a fixed or variable value. Both the maximum charging current and the maximum voltage may be adjusted higher or lower during operation based on the status and energy capacity of the battery.

The single stage conversion module 32 may include a converter 56 having a modulation input, wherein the converter 56 is coupled to the power input 34 and the power output 36 of the single stage conversion module 32. A pulse width modulation (PWM) controller 58 may be coupled to the modulation input of the converter 56 and the transfer function output of the compensation module 40. In operation, the converter 56 may convert the source power based on a modulation signal from the modulation input of the converter 56, wherein the PWM controller 58 may generate the modulation signal based on the transfer function signal from the transfer function output of the compensation module 40. Thus, the adjustments made by the illustrated PWM controller 58 do not depend solely on the source power (e.g., $V_{in}$ and $I_{in}$). Rather, the system power (e.g., $V_{out}$ and $I_{charge}$) output from the converter 56 may also be closely monitored and used to scale the adjustments made by the PWM controller 58.

The illustrated approach therefore enables the compensation module 40 to quickly scale current adjustments either up or down based on system power information. Such a solution may be particularly advantageous in energy harvesting scenarios that encounter substantial discrepancies between the amount of power available from the energy harvester and the amount of power needed to charge the battery and/or operate the system. Moreover, as already noted, configuring the conversion module 32 as a single stage may make information regarding the system power readily available for feedback processing and use by the conversion module 32.

Figure 5:
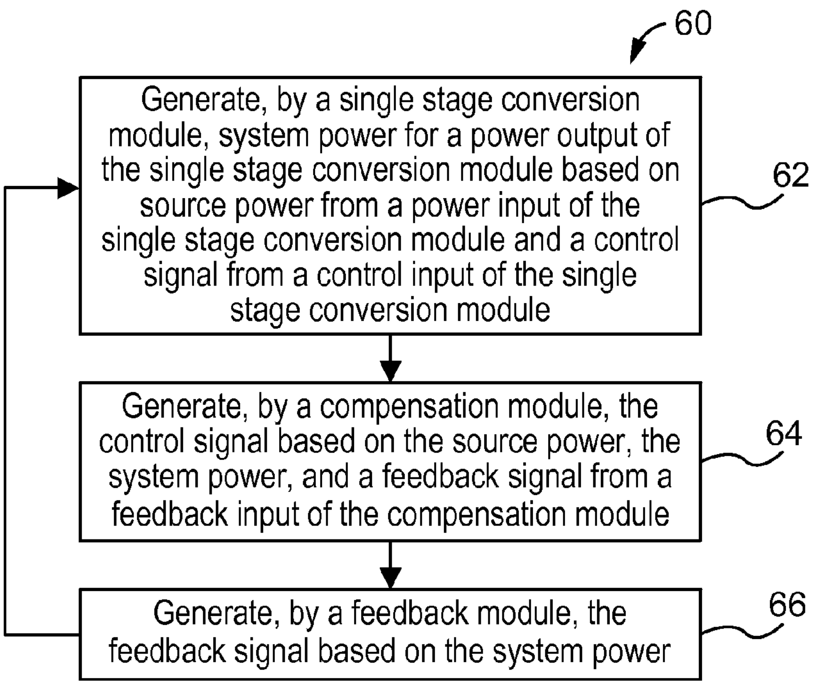
FIG. 5 is a flowchart of an example of a method of operating a transient response apparatus according to an embodiment.

Turning now to FIG. 5, a method 60 of operating a transient response apparatus is shown. The method 60 may be implemented as one or more modules in a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof.

Illustrated processing block 62 provides for generating, by a single stage conversion module, system power for a power output of the single stage conversion module based on source power from a power input of the single stage conversion module and a control signal from a control input of the single stage conversion module. Block 62 may involve, for example, converting, by a converter of the single stage conversion module, the source power based on a modulation signal from a modulation input of the converter and generating, by a PWM controller of the single stage conversion module, the modulation signal based on a transfer function signal from a transfer function output of the compensation module.

The control signal may be generated at block 64, by a compensation module, based on the source power, the system power, and a feedback signal from a feedback input of the compensation module. Block 64 may involve, for example, generating, by a compensator of the compensation module, a transfer function signal for a transfer function output of the compensation module based on a scaled correction signal, generating, by a compensation controller of the compensation module, an unscaled correction signal based on the source power, and generating, by a multiplier of the compensation module, the scaled correction signal based on the unscaled correction and the feedback signal.

Illustrated block 66 generates, by a feedback module, the feedback signal based on the system power. Block 66 may therefore involve, for example, generating, by a loop controller of the feedback module, an error signal via an error output of the loop controller based on a plurality of programmable outputs and the system power, and taking, by a modulus unit of the feedback module, an absolute value of the error signal, wherein the absolute value of the error signal is applied to the feedback input of the compensation module. The error output may be a function of the power output and one or more of the plurality of programmable inputs, which may include one or more of a maximum charge current, a maximum output voltage or a minimum output voltage.

Figure 6:
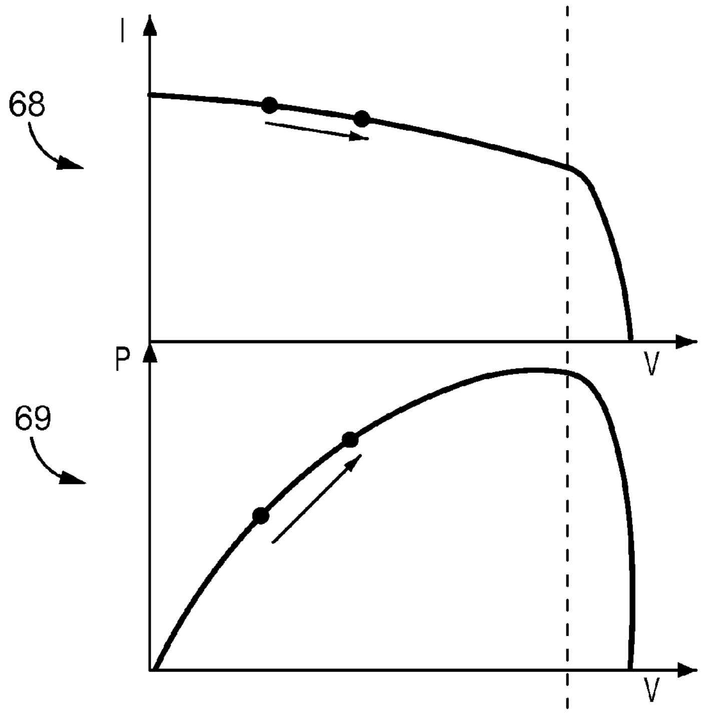
FIG. 6 is a plot of an example of a set of energy harvester curves according to an embodiment.

FIG. 6 shows a set of energy harvester curves including a current curve 68 (e.g., showing source current) and a power curve 69 (e.g., showing source power). In general, if the source current decreases (e.g., Iin_k+1<Iin_k), the source power may increase (e.g., Pin_k+1>Pin_k), while maintaining the condition of the charging current and voltage at the battery being below its limits (e.g., I_battery<Imax and Vout<Vmax), then the output of the compensation controller 52 (FIG. 4) may be "−1". Therefore, the output of the compensation controller and the duty cycle ratio of the PWM controller 58 (FIG. 4) may be decreased. The decrease in duty cycle ratio may in turn cause the input current to decrease and the input power to increase. The converter 56 (FIG. 4) may therefore increase the system voltage (Vout) and then the system current (I_battery) may increase.

In one example, the system voltage (Vout) might have a maximum value of 13V and a minimum value of 11V, the source power at the maximum power point (Pin_MPP) has a value of 45 W, and the source current at the maximum power point (Iin_MPP) has a value of 3 A. If a 3-cell battery is connected with a maximum battery current (Imax) value of 1 A and the system power demand from the load is fixed at 5 W, there may be a large discrepancy of power between the source and the load (i.e., 45 W>>5 W+ charging power to battery). In such a case, the transient response apparatus 20 (FIGS. 1 and 4) may maintain the charge current at 1 A during the constant current mode, then maintain the voltage at the power output of the converter at 13V while the battery charges and discharges in the constant voltage mode as illustrated, for example, in the curves 22, 24, 26 and 28 (FIG. 2), already discussed. The current ripple and voltage ripple at the power output of the converter may be controlled to within relatively low values (e.g., 0.1 A and 0.02V) as illustrated, for example, in curves 28 and 30 (FIG. 3), already discussed. The voltage and current values used herein are to facilitate discussion only and may vary depending on the circumstances.

Figure 7:
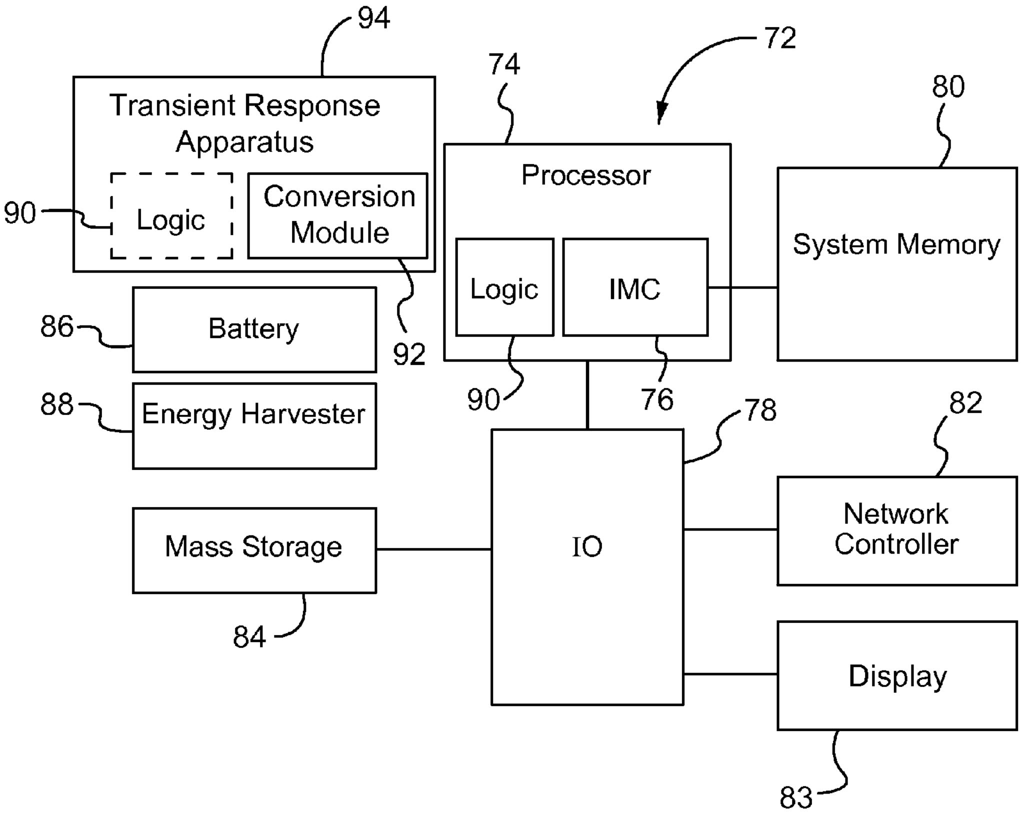
FIG. 7 is a block diagram of an example of a system according to an embodiment.

FIG. 7 shows a computing system 72 that may be part of a device having computing functionality (e.g., personal digital assistant/PDA, notebook computer, tablet computer, convertible tablet, desktop computer, cloud server), communications functionality (e.g., wireless smart phone), imaging functionality, media playing functionality (e.g., smart television/TV), or any combination thereof (e.g., mobile Internet device/MID). In the illustrated example, the system 72 includes a processor 74, an integrated memory controller (IMC) 76, an input output (IO) module 78, system memory 80, a network controller 82, a display 83, and mass storage 84 (e.g., optical disk, hard disk drive/HDD, flash memory). In one example, the system 72 is powered by a battery 86 and/or energy harvester 88, wherein the energy harvester 88 may alternatively charge the battery 86.

The processor 74 may include a core region with one or several processor cores (not shown). The illustrated IO module 78, sometimes referred to as a Southbridge or South Complex of a chipset, functions as a host controller and communicates with the network controller 82, which could provide off-platform communication functionality for a wide variety of purposes such as, for example, cellular telephone (e.g., Wideband Code Division Multiple Access/W-CDMA (Universal Mobile Telecommunications System/UMTS), CDMA2000 (IS-856/IS-2000), etc.), WiFi (Wireless Fidelity, e.g., Institute of Electrical and Electronics Engineers/IEEE 802.11-2007, Wireless Local Area Network/LAN Medium Access Control (MAC) and Physical Layer (PHY) Specifications), 4G LTE (Fourth Generation Long Term Evolution), Bluetooth (e.g., IEEE 802.15.1-2005, Wireless Personal Area Networks), WiMax (e.g., IEEE 802.16-2004, LAN/MAN Broadband Wireless LANS), Global Positioning System (GPS), spread spectrum (e.g., 900 MHz), and other radio frequency (RF) telephony purposes. Other standards and/or technologies may also be implemented in the network controller 82. The IO module 78 may also include one or more wireless hardware circuit blocks to support such functionality.

Although the processor 74 and IO module 78 are illustrated as separate blocks, the processor 74 and IO module 78 may be implemented as a system on chip (SoC) on the same semiconductor die. The system memory 80 may include, for example, double data rate (DDR) synchronous dynamic random access memory (SDRAM, e.g., DDR3 SDRAM JEDEC Standard JESD79-3C, April 2008) modules. The modules of the system memory 80 may be incorporated into a single inline memory module (SIMM), dual inline memory module (DIMM), small outline DIMM (SODIMM), and so forth.

The system 72 may include a transient response apparatus 94 that functions similarly to the transient response apparatus 20 (FIGS. 1 and 4), already discussed. Thus, the transient response apparatus 94 may include a single stage conversion module 92 having a power input, a power output and a control input. The single stage conversion module 92 may generate system power for the power output based on source power from the power input and a control signal from the control input. The illustrated processor 74 includes logic 90 (e.g., logic instructions, configurable logic, fixed-functionality hardware logic, etc., or any combination thereof) to generate, by a compensation module, a control signal based on source power from the power input of the single stage conversion module 92, system power from the power output of the single stage conversion module 92, and a feedback signal from a feedback input of the compensation module. The logic 90 may also generate, by a feedback module, the feedback signal based on the system power. While the logic 90 is shown as residing in the processor 74, the logic 90 may also be implemented elsewhere in the system 72 such as, for example, in the transient response apparatus 94 or a power management integrated circuit (PMIC, not shown).

ADDITIONAL NOTES AND EXAMPLES

Example 1 may include a system to manage power delivery, comprising a load including one or more of a processor, a memory device or a display and a transient response apparatus. The transient response apparatus may include a single stage conversion module having a power input, a power output coupled to the load, and a control input, and a compensation module including a feedback input, the compensation module coupled to the power input, the power output and the control input of the single stage conversion module. The transient response apparatus may also include a feedback module coupled to the power output of the single stage conversion module and the feedback input of the compensation module.

Example 2 may include the system of Example 1, wherein the feedback module includes a loop controller having a plurality of programmable inputs and an error output, and a modulus unit coupled to the error output of the loop controller and the feedback input of the compensation module.

Example 3 may include the system of Example 2, wherein the error output is to be a function of the power output and one or more of the plurality of programmable inputs.

Example 4 may include the system of Example 2, wherein the plurality of programmable inputs include one or more of a maximum charge current, a maximum output voltage or a minimum output voltage.

Example 5 may include the system of any one of Examples 1 to 4, wherein the single stage conversion module includes a converter having a modulation input, the converter coupled to the power input and the power output of the single stage conversion module, and a pulse width modulation controller coupled to the modulation input of the converter and a transfer function output of the compensation module.

Example 6 may include the system of any one of Examples 1 to 4, wherein the compensation module includes a compensator having a transfer function output coupled to the control input of the single stage conversion module, a compensation controller coupled to the power input of the single stage conversion module, and a multiplier coupled to the compensator, the compensation controller and the feedback input of the compensation module.

Example 7 may include the system of any one of Examples 1 to 4, further including an energy harvester coupled to the load and the transient response apparatus, wherein the energy harvester includes one or more of a photovoltaic source or a piezoelectric source, and a battery coupled to the energy harvester, the load and the transient response apparatus.

Example 8 may include a transient response apparatus comprising a single stage conversion module including a power input, a power output and a control input, and a compensation module including a feedback input, the compensation module coupled to the power input, the power output and the control input of the single stage conversion module. The transient response apparatus may also comprise a feedback module coupled to the power output of the single stage conversion module and the feedback input of the compensation module.

Example 9 may include the apparatus of Example 8, wherein the feedback module includes a loop controller having a plurality of programmable inputs and an error output, and a modulus unit coupled to the error output of the loop controller and the feedback input of the compensation module.

Example 10 may include the apparatus of Example 9, wherein the error output is to be a function of the power output and one or more of the plurality of programmable inputs.

Example 11 may include the apparatus of Example 9, wherein the plurality of programmable inputs include one or more of a maximum charge current, a maximum output voltage or a minimum output voltage.

Example 12 may include the apparatus of any one of Examples 8 to 11, wherein the single stage conversion module includes a converter having a modulation input, the converter coupled to the power input and the power output of the single stage conversion module, and a pulse width modulation controller coupled to the modulation input of the converter and a transfer function output of the compensation module.

Example 13 may include the apparatus of any one of Examples 8 to 11, wherein the compensation module includes a compensator having a transfer function output coupled to the control input of the single stage conversion module, a compensation controller coupled to the power input of the single stage conversion module, and a multiplier coupled to the compensator, the compensation controller and the feedback input of the compensation module.

Example 14 may include a method of operating a transient response apparatus, comprising generating, by a single stage conversion module, system power for a power output of the single stage conversion module based on source power from a power input of the single stage conversion module and a control signal from a control input of the single stage conversion module, generating, by a compensation module, the control signal based on the source power, the system power, and a feedback signal from a feedback input of the compensation module, and generating, by a feedback module, the feedback signal based on the system power.

Example 15 may include the method of Example 14, further including generating, by a loop controller of the feedback module, an error signal via an error output of the loop controller based on a plurality of programmable inputs and the system power, and taking, by a modulus unit of the feedback module, an absolute value of the error signal, wherein the absolute value of the error signal is applied to the feedback input of the compensation module.

Example 16 may include the method of Example 15, wherein the error output is a function of the power output and one or more of the plurality of programmable inputs.

Example 17 may include the method of Example 15, wherein the plurality of programmable inputs include one or more of a maximum charge current, a maximum output voltage or a minimum output voltage.

Example 18 may include the method of any one of Examples 14 to 17, further including converting, by a converter of the single stage conversion module, the source power based on a modulation signal from a modulation input of the converter, and generating, by a pulse width modulation controller of the single stage conversion module, the modulation signal based on a transfer function signal from a transfer function output of the compensation module.

Example 19 may include the method of any one of Examples 14 to 17, further including generating, by a compensator of the compensation module, a transfer function signal for a transfer function output of the compensation module based on a scaled correction signal, generating, by a compensation controller of the compensation module, an unscaled correction signal based on the source power, and generating, by a multiplier of the compensation module, the scaled correction signal based on the unscaled correction signal and the feedback signal.

Example 20 may include at least one computer readable storage medium comprising a set of instructions which, when executed by a computing system, cause the computing system to generate, by a compensation module, a control signal based on source power from a power input of a single stage conversion module, system power from a power output of the single stage conversion module, and a feedback signal from a feedback input of the compensation module, and generate, by a feedback module, the feedback signal based on the system power.

Example 21 may include the at least one computer readable storage medium of Example 19, wherein the instructions, when executed, cause a computing system to generate, by a loop controller of the feedback module, an error signal via an error output of the loop controller based on a plurality of programmable inputs and the system power, and take, by a modulus unit of the feedback module, an absolute value of the error signal, wherein the absolute value of the error signal is applied to the feedback input of the compensation module.

Example 22 may include the at least one computer readable storage medium of Example 21, wherein the error output is to be a function of the power output and one or more of the plurality of programmable inputs.

Example 23 may include the at least one computer readable storage medium of Example 21, wherein the plurality of programmable inputs are to include one or more of a maximum charge current, a maximum output voltage or a minimum output voltage.

Example 24 may include the at least one computer readable storage medium of any one of Examples 20 to 23, wherein the instructions, when executed, cause a computing system to generate, by a compensator of the compensation module, a transfer function signal for a transfer function output of the compensation module based on a scaled correction signal, generate, by a compensation controller of the compensation module, an unscaled correction signal based on the source power, and generate, by a multiplier of the compensation module, the scaled correction signal based on the unscaled correction signal and the feedback signal.

Thus, techniques may provide a control scheme for a general purpose power converter so that the conversion module can respond faster and stably to perturbations resulting from power imbalances between versatile power sources and load demands. As a result, a cost-effective solution may be achieved for size-constrained mobile devices such as tablet computers, convertible tablets and other handheld devices.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A, B, C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A system comprising:

a load including one or more of a processor, a memory device or a display;

a transient response apparatus including:

a single stage conversion module having a power input, a power output coupled to the load, and a control input, a compensation module including a feedback input, the compensation module coupled to the power input, the power output and the control input of the single stage conversion module, a feedback module coupled to the power output of the single stage conversion module and the feedback input of the compensation module, and a multiplier to generate a scaled correction signal based on an unscaled correction signal and the feedback signal.

2. The system of claim 1, wherein the feedback module includes:

a loop controller having a plurality of programmable inputs and an error output; and a modulus unit coupled to the error output of the loop controller and the feedback input of the compensation module.

3. The system of claim 2, wherein the error output is to be a function of the power output and one or more of the plurality of programmable inputs.

4. The system of claim 2, wherein the plurality of programmable inputs include one or more of a maximum charge current, a maximum output voltage or a minimum output voltage.

5. The system of claim 1, wherein the single stage conversion module includes:

a converter having a modulation input, the converter coupled to the power input and the power output of the single stage conversion module; and a pulse width modulation controller coupled to the modulation input of the converter and a transfer function output of the compensation module.

6. The system of claim 1, wherein the compensation module includes:

a compensator having a transfer function output coupled to the control input of the single stage conversion module;

a compensation controller coupled to the power input of the single stage conversion module; and the multiplier coupled to the compensator, the compensation controller and the feedback input of the compensation module.

7. The system of claim 1, further including:

an energy harvester coupled to the load and the transient response apparatus, wherein the energy harvester includes one or more of a photovoltaic source or a piezoelectric source; and a battery coupled to the energy harvester, the load and the transient response apparatus.

8. A transient response apparatus comprising:

a single stage conversion module including a power input, a power output and a control input;

a compensation module including a feedback input, the compensation module coupled to the power input, the power output and the control input of the single stage conversion module;

a feedback module coupled to the power output of the single stage conversion module and the feedback input of the compensation module; and a multiplier to generate a scaled correction signal based on an unscaled correction signal and the feedback input.

9. The apparatus of claim 8, wherein the feedback module includes:

a loop controller having a plurality of programmable inputs and an error output; and a modulus unit coupled to the error output of the loop controller and the feedback input of the compensation module.

10. The apparatus of claim 9, wherein the error output is to be a function of the power output and one or more of the plurality of programmable inputs.

11. The apparatus of claim 9, wherein the plurality of programmable inputs include one or more of a maximum charge current, a maximum output voltage or a minimum output voltage.

12. The apparatus of claim 8, wherein the single stage conversion module includes:

a converter having a modulation input, the converter coupled to the power input and the power output of the single stage conversion module; and a pulse width modulation controller coupled to the modulation input of the converter and a transfer function output of the compensation module.

13. The apparatus of claim 8, wherein the compensation module includes:

a compensator having a transfer function output coupled to the control input of the single stage conversion module; and a compensation controller coupled to the power input of the single stage conversion module; and the multiplier coupled to the compensator, the compensation controller and the feedback input of the compensation module.

14. A method of operating a transient response apparatus, comprising:

generating, by a single stage conversion module, system power for a power output of the single stage conversion module based on source power from a power input of the single stage conversion module and a control signal from a control input of the single stage conversion module;

generating, by a compensation module, the control signal based on the source power, the system power, and a feedback signal from a feedback input of the compensation module;

generating, by a feedback module, the feedback signal based on the system power; and generating, by a multiplier of the compensation module, a scaled correction signal based on an unscaled correction signal and the feedback signal.

15. The method of claim 14, further including:

generating, by a loop controller of the feedback module, an error signal via an error output of the loop controller based on a plurality of programmable inputs and the system power; and taking, by a modulus unit of the feedback module, an absolute value of the error signal, wherein the absolute value of the error signal is applied to the feedback input of the compensation module.

16. The method of claim 15, wherein the error output is a function of the power output and one or more of the plurality of programmable inputs.

17. The method of claim 15, wherein the plurality of programmable inputs include one or more of a maximum charge current, a maximum output voltage or a minimum output voltage.

18. The method of claim 14, further including:

converting, by a converter of the single stage conversion module, the source power based on a modulation signal from a modulation input of the converter; and generating, by a pulse width modulation controller of the single stage conversion module, the modulation signal based on a transfer function signal from a transfer function output of the compensation module.

19. The method of claim 14, further including:

generating, by a compensator of the compensation module, a transfer function signal for a transfer function output of the compensation module based on the scaled correction signal; and generating, by a compensation controller of the compensation module, the unsealed correction signal based on the source power.

20. At least one computer readable storage medium comprising a set of instructions which, when executed by a computing system, cause the computing system to:

generate, by a compensation module, a control signal based on source power from a power input of a single stage conversion module, system power from a power output of the single stage conversion module, and a feedback signal from a feedback input of the compensation module;

generate, by a feedback module, the feedback signal based on the system power; and generate, by a multiplier of the compensation module, a scaled correction signal based on a unsealed correction signal and the feedback signal.

21. The at least one computer readable storage medium of claim 20, wherein the instructions, when executed, cause a computing system to:

generate, by a loop controller of the feedback module, an error signal via an error output of the loop controller based on a plurality of programmable inputs and the system power; and take, by a modulus unit of the feedback module, an absolute value of the error signal, wherein the absolute value of the error signal is applied to the feedback input of the compensation module.

22. The at least one computer readable storage medium of claim 21, wherein the error output is to be a function of the power output and one or more of the plurality of programmable inputs.

23. The at least one computer readable storage medium of claim 21, wherein the plurality of programmable inputs are to include one or more of a maximum charge current, a maximum output voltage or a minimum output voltage.

24. The at least one computer readable storage medium of claim 20, wherein the instructions, when executed, cause a computing system to:

generate, by a compensator of the compensation module, a transfer function signal for a transfer function output of the compensation module based on the scaled correction signal; and generate, by a compensation controller of the compensation module, the unscaled correction signal based on the source power.

* * * * *